(12) United States Patent
Homa et al.

(10) Patent No.: US 8,984,956 B2
(45) Date of Patent: Mar. 24, 2015

(54) SENSING ASSEMBLY

(75) Inventors: Daniel S. Homa, Blacksburg, VA (US);
Robert M. Harman, Troutville, VA (US); Malcolm S. Laing, Blacksburg, VA (US); Charles A. Giebner, Salem, VA (US); Christopher H. Lambert, Blacksburg, VA (US)

(73) Assignee: Baker Huges Incorporated, Houston, TX (US)

( * ) Notice: Subject to any disclaimer, the term of this patent is extended or adjusted under 35 U.S.C. 154(b) by 529 days.

(21) Appl. No.: 13/272,299

(22) Filed: Oct. 13, 2011

(65) Prior Publication Data

US 2013/0091956 A1 Apr. 18, 2013

(51) Int. Cl.
G01L 1/24 (2006.01)
G02B 6/44 (2006.01)
G01D 5/353 (2006.01)

(52) U.S. Cl.
CPC ............ *G01L 1/242* (2013.01); *G01D 5/35374* (2013.01)
USPC ............................................. 73/800; 385/100

(58) Field of Classification Search
USPC ............. 385/100, 102, 137; 166/65.1; 73/800
See application file for complete search history.

(56) References Cited

U.S. PATENT DOCUMENTS

| | | | | |
|---|---|---|---|---|
| 4,812,645 A * | 3/1989 | Griffiths | | 250/227.14 |
| 5,029,977 A * | 7/1991 | Wheeler et al. | | 385/123 |
| 5,098,610 A * | 3/1992 | Okamura et al. | | 252/511 |
| 5,399,854 A * | 3/1995 | Dunphy et al. | | 250/227.17 |
| 5,594,819 A * | 1/1997 | Narendran et al. | | 385/12 |
| 5,913,245 A * | 6/1999 | Grossman | | 73/800 |
| 6,311,564 B1 * | 11/2001 | Martin et al. | | 73/787 |
| 6,571,639 B1 * | 6/2003 | May et al. | | 73/800 |
| 7,471,860 B2 * | 12/2008 | Coronado et al. | | 385/100 |
| 8,025,445 B2 * | 9/2011 | Rambow et al. | | 385/95 |
| 8,567,657 B2 * | 10/2013 | Andreychuk | | 228/155 |
| 2006/0215976 A1 * | 9/2006 | Singh et al. | | 385/126 |
| 2007/0169929 A1 * | 7/2007 | Hall et al. | | 166/65.1 |
| 2008/0263848 A1 * | 10/2008 | Andreychuk | | 29/428 |
| 2008/0279513 A1 * | 11/2008 | Coronado et al. | | 385/107 |
| 2009/0142024 A1 * | 6/2009 | Varma et al. | | 385/100 |
| 2010/0151239 A1 * | 6/2010 | Hebert et al. | | 428/351 |
| 2011/0240163 A1 * | 10/2011 | Auzerais et al. | | 138/103 |
| 2012/0132007 A1 * | 5/2012 | Dria et al. | | 73/760 |
| 2013/0021874 A1 * | 1/2013 | Hartog et al. | | 367/31 |

OTHER PUBLICATIONS

Karthick et al. "Polymerization Shrinkage of Composites" JIADS. vol. 2, Issue 2. Apr.-Jun. 2011. pp. 32-36. Accessed online Aug. 13, 2014. <jiads.net/Archives/2011/9.pdf>.*
Offshore, [online]; [retrieved on Feb. 6, 2012]; retrieved from the Internet http://www.offshore-mag.com/articles/print/volume-71/issue-10/production-operations/subsea-strain-sensing-assembly-improves-riser-integrity-monitoring.html. Gallagher et al., "Subsea strain sensing assembly improves riser integrity monitoring," 6p.

* cited by examiner

*Primary Examiner* — Lisa Caputo
*Assistant Examiner* — Jonathan Dunlap
(74) *Attorney, Agent, or Firm* — Cantor Colburn LLP

(57) ABSTRACT

A sensing assembly including a fiber for monitoring at least one condition or parameter and a strip formed from a pair of laminae disposed with the fiber. The laminae are arranged parallel to each other and engaged longitudinally along the fiber for enabling the strip to secure the fiber in place. A method of monitoring a parameter or condition with a sensing assembly is also included.

18 Claims, 3 Drawing Sheets

SENSING ASSEMBLY

BACKGROUND

Fibers are commonly used for enabling various conditions or parameters such as strain, temperature, noise, etc. to be sensed and/or monitored from remote locations. Such fibers are ubiquitous in the downhole drilling and completions industry. In current strain sensing applications, epoxies and other polymers are used to secure fibers to downhole components. However, these materials tend to creep in high temperature downhole environments, degrading the ability of the fiber to sense strain. Additionally, there is a very high cost involved with forming helical grooves or the like in tubulars for securing the fibers to the tubulars. As a result of the foregoing, new sensing assemblies for addressing these and other shortcomings are well received.

BRIEF DESCRIPTION

A sensing assembly, including a fiber for monitoring at least one condition or parameter; and a strip formed from a pair of laminae disposed with the fiber, the laminae arranged parallel to each other and engaged longitudinally along the fiber for enabling the strip to secure the fiber in place.

A system for enabling the monitoring of a condition or parameter including a component having or located adjacent to a location having a condition or parameter to be monitored; a fiber operatively engaged against the component for enabling monitoring of the condition or parameter; and a strip extending longitudinally along the fiber and operatively deformed about the component and the fiber for securing the fiber to the component.

A method of monitoring a parameter or condition with a sensing assembly including attaching a fiber of a sensing assembly to a component with a strip of the sensing assembly, the strip formed from a pair of laminae disposed with the fiber, the laminae arranged parallel to each other and engaged longitudinally along the fiber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
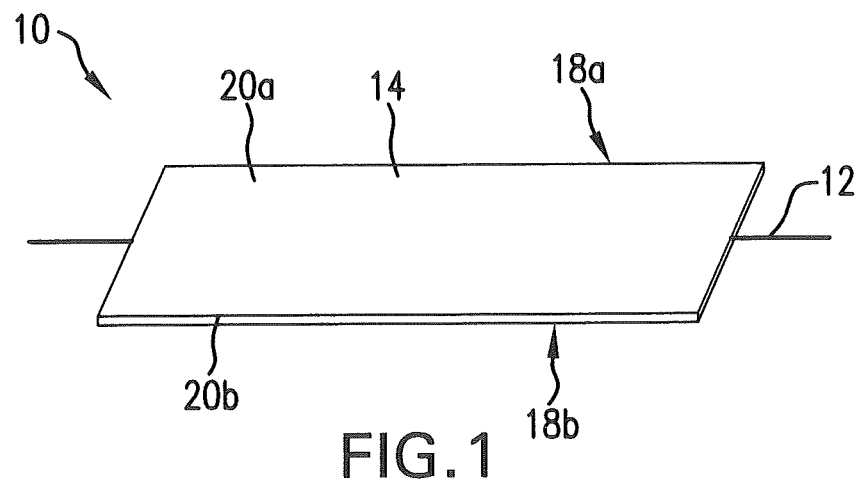
FIG. 1 schematically illustrates a sensing assembly according to one embodiment disclosed herein.

Referring now to the drawings, FIG. 1 schematically illustrates one embodiment, i.e., a sensing assembly 10. The assembly 10 is formed by a fiber 12 disposed with a strip 14. Although only one fiber is shown, multiple of the fibers 12 could be disposed with the strip 14. The fibers are arranged to enable a condition or conditions, such as temperature, noise, strain, etc. to be sensed or remotely monitored, and could be, for example, optical fibers. The assembly 10 could be used in real-time compaction imaging or real time compaction monitoring applications. The strip 14 could extend along only a portion or discrete portions of the fiber 12, or could be included essentially continuously along the entire length or a majority of the length of the fiber 12. For example, a roll forming operation (see the discussion below with respect to FIG. 6) could be used to continuously create the assembly 10. In some embodiments, the assembly 10 is storable on rolls or reels, unrolled and cut to length as needed, etc. The strip 14 could be formed from sheet metal, e.g., stainless steel, copper, alloys thereof, etc., for providing durability and workability of the assembly 10, although other materials may also work suitably. The thickness (i.e., gauge) of the strip 14 could vary depending on the particular use of the assembly 10, as could the width of the strip 14. Fiber Bragg gratings, Rayleigh scattering, Brillouin scattering, Raman scattering, etc., or any other known techniques can be used for sensing with the fiber 12. Other fibers and/or sensors could be used in other embodiments, with the fibers arranged for monitoring the desired parameter or condition, e.g., sensing the parameter or condition, or communicating data or information related to the parameter or condition from one location to another.

Figure 2:
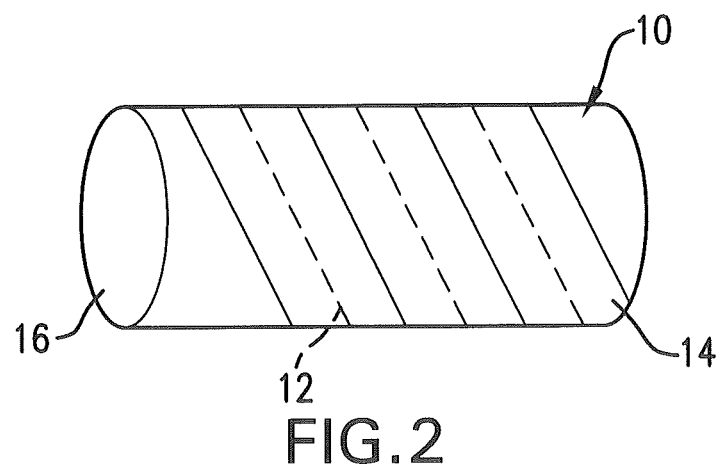
FIG. 2 schematically illustrates a sensing assembly circumferentially arranged about a component.
Figure 3:
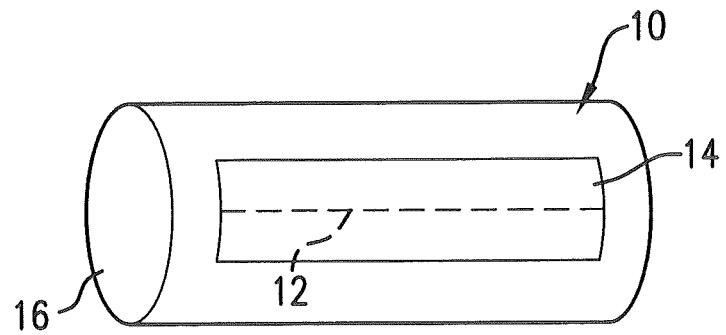
FIG. 3 schematically illustrates a sensing assembly longitudinally arranged with a component.

Generally, the assembly 10 in the embodiments of FIGS. 1-3 resembles a tape, ribbon, etc. that is installable on or with a component for measuring a property of that component or a condition present near the component. Instead of grooves, channels, etc. being formed in the component, the assembly 10 can be wrapped about or otherwise engaged with the component for securing the fiber 12 in place for sensing applications. For example, in FIG. 2 the assembly 10 is shown wrapped circumferentially (e.g., helically) about a component 16, while in FIG. 3 the assembly 10 is shown longitudinally engaged along the component 16 and curved against the contours thereof. Metals such as copper and stainless steel, as noted above, work particularly well in some embodiments as they provide sufficiently good plastic deformability and workability for enabling the act of wrapping the strip 14 about a component to secure the assembly 10 to the component. That is, materials can be selected for the strip 14 that plastically deform about or with a component for securing the assembly 10 to the component without the need for any other affixers or fasteners. In other embodiments a ceramic, composite, polymer, plastic extrustion, polymidie tape, woven sheet, etc., may work suitably and/or some other affixer or fastener may be included for assisting in securing the assembly 10 to a component. For example, in one embodiment the strip 14 is formed from an epoxy impregnated cloth or woven sheet that is wrapped as shown and discussed and then hardened to secure the assembly to a component. The component 16 is shown schematically and could be, for example, a tubular, tool, or other component that are e.g., installable or runnable downhole. In the event that the component 16 is a hollow tube, cable, channel, etc., a pair of opposite longitudinal edges 18a and 18b can be wrapped, bent, or curved toward each other, e.g., in a tube mill, for forming a tube shape of the assembly 10. The tube-shaped arrangement could resemble that of a fiber-in-metal-tube assembly (even if other materials are used) for holding fibers therein and be insertable through an opening or hollow space, runnable through tubulars, etc. The edges 18a and 18b can be welded or otherwise secured together to maintain the tube-shape.

Figure 4:
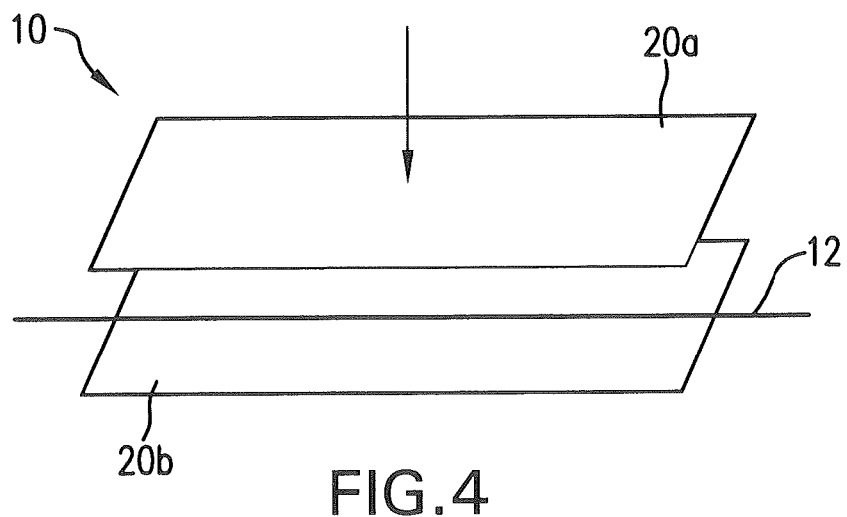
FIG. 4 schematically illustrates a sensing assembly having a strip formed from two separate sheets.
Figure 5:
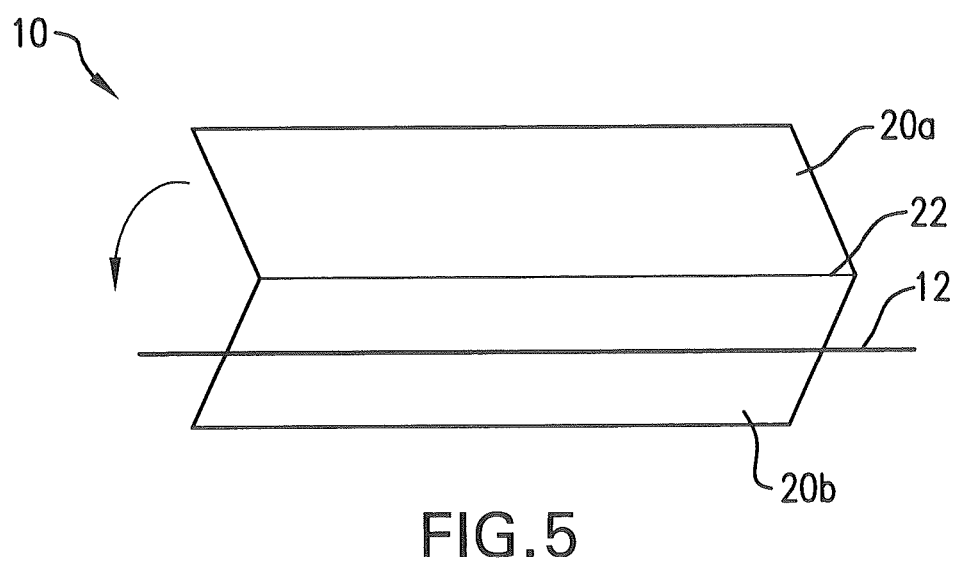
FIG. 5 schematically illustrates a sensing assembly having a strip formed from a single sheet.

The strip 14 is shown formed from laminae 20a and 20b surrounding the fiber 12, although other structures, e.g., only one or more than two laminae, are possible. The laminae 20a and 20b can be formed from multiple sheets or from a single sheet. The laminae 20a and 20b can have any suitable thickness, e.g., in accordance with standard sheet metal gauges or the like. For example, in FIG. 4, the laminae 20a and 20b are separate components that are pressed together with the fiber 12 located therebetween. In FIG. 5, the strip 14 is formed integrally, i.e., from a single piece of material. For example, by creating a fold 22, the laminae 20a and 20b result from a single sheet of material. As noted above, the fiber 12 could take the form of optical fiber. Advantageously, the relatively high radial compressive strength of optical fiber enables the strip 14 and/or laminae 20a and 20b to be tightly fit, e.g., plastically deformed, about the fiber 12, e.g. by rolling or pressing operations, for enabling the assembly 10 to accurately sense strain even at high temperatures. It is to be noted that in some embodiments the fiber 12 may be located outside of the strip 14, e.g., not between laminae of the strip 14, and held in place by being pressed against a component, e.g., the component 16, by the strip 14. In such embodiments, deformation of the strip 14 about the fiber 12 and the component may be sufficient for enabling the strip 14 to secure the fiber 12 to the component for sensing or monitoring some condition or parameter. If so arranged, an adhesive may be used to at least temporarily secure the fiber 12 to the strip 14 until the strip 14 can be arranged on the component.

The pressing, folding, shaping, and other manufacturing processes could be performed, for example, from a rolling or roll forming operation. For example, in the embodiment of FIG. 4, the assembly 10 is formable by laying down or unrolling a sheet forming the lamina 20a, laying down or unrolling the fiber 12, laying down or unrolling a second sheet forming the lamina 20b, then pressing or deforming the laminae 20a and 20b about the fiber 12. For example, the fiber 12, and the laminae 20a and 20b could all be provided initially on rolls or reels and simultaneously or sequentially unrolled and then deformed together to form the assembly 10.

Figure 6:
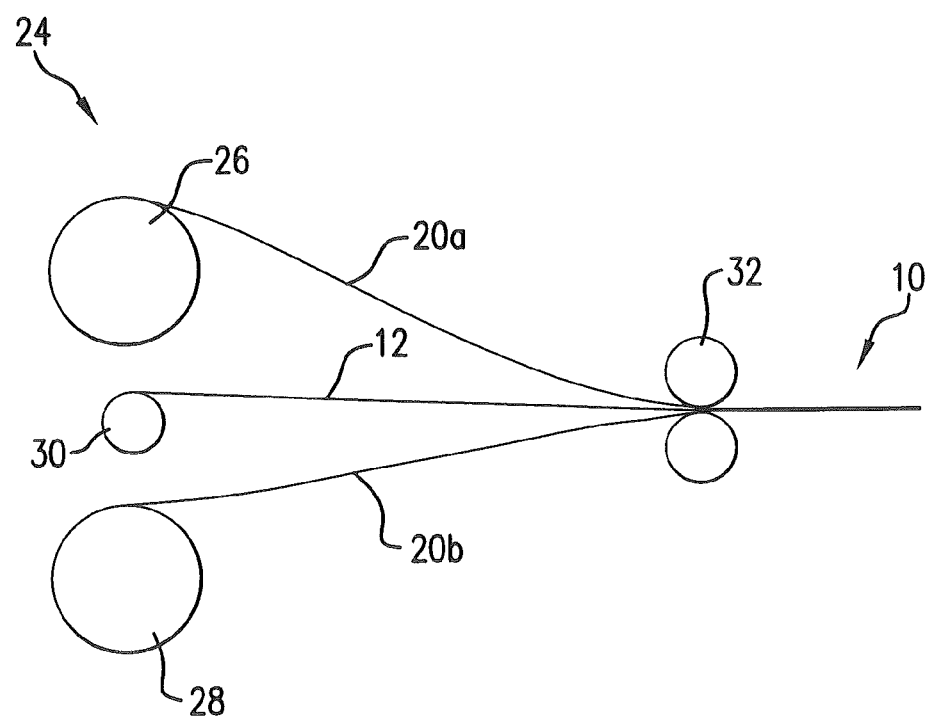
FIG. 6 schematically illustrates a process for manufacturing a sensing assembly.

One example for continuous manufacturing is shown in FIG. 6, although it should be clear that this assembly could operate sequentially as described above. In FIG. 6, a system 24 comprises a first roll 26 of material for forming the lamina 16a, a second roll 28 of material for forming the second lamina 16b, and a reel 30 of the fiber 12. By directing the fiber 12 and both of the laminae 20a and 20b through a set of rollers 32, the laminae 20a and 20b are tightly fit with the fiber 12. It is also to be appreciated that by removing the second roll 28 and providing additional rollers for roll forming the fold 22, the system 24 is adaptable for manufacturing the strip 14 from a single sheet of material. Moreover, additional rollers could be added to fold over, crimp, or otherwise affix together opposite edges 18a and/or 18b of the strip 14 for securing the strip 14 with the fiber 12. Of course, adhesives, epoxies, polyimide materials, welds, etc. could be used to even more securely hold the assembly 10 together, e.g., to secure the fiber 12 to the strip 14. If epoxies or the like are used, it should be noted that the aforementioned creep problems at high temperatures will not occur if materials are selected for the strip 14 that enable a tight mechanical fit or plastic deformation between the fiber 12 and the strip 14.

Once the assembly 10 is formed, it can be again stored on a roll or reel, providing an essentially continuous manufacturing process for the assembly 10. In view of other embodiments discussed above, the manufacturing process could be altered. For example, the fiber 12 could be continuously supplied, while the laminae 20a and/or 20b are only intermittently supplied, etc. Thus, the strip 14 could be formed at only discrete locations along the fiber 12, or as a structure having one essentially continuous lamina and one lamina located at discrete locations for providing support, etc. In some embodiments the laminae 20a and 20b are formed having different thicknesses, widths, lengths, materials, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A sensing assembly, comprising:
a fiber for monitoring at least one condition or parameter; and
a strip formed from a plurality of laminae disposed with the fiber, the plurality of laminae arranged parallel to each other and engaged longitudinally along the fiber for enabling the strip to secure the fiber in place, wherein the strip is plastically deformed about the fiber forming a fold that is displaced from the fiber.

2. The assembly of claim 1, wherein the assembly is secured to a downhole component.

3. The assembly of claim 2, wherein the assembly is secured in place by being wrapped about the component.

4. The assembly of claim 2, wherein the assembly is longitudinally aligned with the component.

5. The assembly of claim 2, wherein the strip of the assembly is plastically deformed for securing the assembly to the component.

6. The assembly of claim 1, wherein the fiber is an optical fiber.

7. The assembly of claim 1, wherein the plurality of laminae are formed separately.

8. The assembly of claim 1, wherein the plurality of laminae are formed integrally from a single sheet.

9. The assembly of claim 1, wherein the strip comprises a metal.

10. The assembly of claim 9, wherein the metal is copper, stainless steel, alloys or compositions thereof, or combinations including at least one of the foregoing.

11. The assembly of claim 1, wherein the parameter or condition is strain, temperature, noise, or combinations including at least one of the foregoing.

12. The assembly of claim 1, wherein the parameter or condition is strain in a component and the strip is plastically deformed about both the fiber and the component.

13. The assembly of claim 1, wherein the assembly is at least partially formed by a roll forming operation.

14. The assembly of claim 1, wherein the assembly is operatively formed as a tape or ribbon.

15. The assembly of claim 1, wherein the plurality of laminae comprise a pair of laminae oppositely disposed about the fiber.

16. A system for enabling the monitoring of a condition or parameter comprising:
   a component having or located adjacent to a location having a condition or parameter to be monitored;
   a fiber operatively engaged against the component for enabling monitoring of the condition or parameter; and
   a strip extending longitudinally along the fiber and operatively deformed about the component and plastically deformed about the fiber forming a fold that is displaced from the fiber, the strip securing the fiber to the component.

17. A method of monitoring a parameter or condition with a sensing assembly comprising:
   attaching a fiber of a sensing assembly to a component with a strip of the sensing assembly, the strip formed from a plurality of laminae disposed with the fiber, the plurality of laminae arranged parallel to each other and engaged longitudinally along the fiber, wherein attaching the fiber includes plastically deforming the strip about the fiber forming a fold that is displaced from the fiber.

18. The method of claim 17, wherein the fiber comprises optical fiber and is operatively arranged for sensing strain, temperature, noise, or combinations including at least one of the foregoing.

* * * * *